United States Patent
Chi-Johnston et al.

(10) Patent No.: US 12,091,001 B2
(45) Date of Patent: Sep. 17, 2024

(54) SAFETY MEASUREMENT OF AUTONOMOUS VEHICLE DRIVING IN SIMULATION

(71) Applicant: GM Cruise Holdings LLC, San Francisco, CA (US)

(72) Inventors: Geoffrey Louis Chi-Johnston, San Francisco, CA (US); Laura Athena Freeman, Golden, CO (US); Christopher Brian Roland, Santa Monica, CA (US); Daniel Tien, San Francisco, CA (US); Feng Tian, Foster City, CA (US); Seunghyun Min, Oakland, CA (US); Lei Huang, San Jose, CA (US); Diego Plascencia-Vega, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 372 days.

(21) Appl. No.: 17/725,227

(22) Filed: Apr. 20, 2022

(65) Prior Publication Data
US 2023/0339459 A1    Oct. 26, 2023

(51) Int. Cl.
*B60W 30/095* (2012.01)
*B60W 30/10* (2006.01)
*B60W 60/00* (2020.01)

(52) U.S. Cl.
CPC .......... *B60W 30/095* (2013.01); *B60W 30/10* (2013.01); *B60W 60/0015* (2020.02); *B60W 2510/0638* (2013.01); *B60W 2554/4049* (2020.02)

(58) Field of Classification Search
CPC .......... B60W 30/095; B60W 60/0015; B60W 30/10; B60W 2554/4049; B60W 2510/0638
See application file for complete search history.

(56) References Cited

U.S. PATENT DOCUMENTS

2019/0303759 A1* 10/2019 Farabet .................... G05D 1/00
2021/0192358 A1*  6/2021 Song ....................... G06N 3/092
2022/0126863 A1*  4/2022 Moustafa ................. G06T 9/00

FOREIGN PATENT DOCUMENTS

CN         108290579 B  *  4/2022      .............. B60L 15/20

* cited by examiner

*Primary Examiner* — Vivek D Koppikar
*Assistant Examiner* — Jeffrey R Chalhoub

(57) ABSTRACT

The present technology is directed to training and the use of a machine learning model to measure the safety of an autonomous vehicle (AV) driving in simulation. An AV management system can run a simulation of an AV autonomously piloting itself and collect simulation driving data. Further, the AV management system can parse the simulation driving data into kinematic and semantic environmental features and output a simulation safety score of the simulation based on the kinematic and semantic environmental features. The simulation safety score indicates a probability of a safety critical event such as a collision or a near-miss between the AV and the at least one simulated object in the simulation.

17 Claims, 7 Drawing Sheets

SAFETY MEASUREMENT OF AUTONOMOUS VEHICLE DRIVING IN SIMULATION

TECHNICAL FIELD

The subject technology relates to solutions for measuring the safety of autonomous vehicle driving in simulation, and more particularly, for training and using a machine learning model to predict a likelihood of a safety critical event during autonomous vehicle driving in simulation.

BACKGROUND

Autonomous vehicles (AVs) have computers and control systems that perform driving and navigation tasks conventionally performed by a human driver. As AV technologies continue to advance, a simulation for AV testing, which reproduces real-world characteristics has been important in improving the safety and efficiency of AV driving. An exemplary AV can include various sensors, such as a camera sensor, a Light Detection and Ranging (LiDAR) sensor, a Radio Detection and Ranging (RADAR) sensor, and software for interpreting data received from the sensors. Collectively these sensors and software can be used to allow an AV to pilot itself.

BRIEF DESCRIPTION OF THE DRAWINGS

Illustrative embodiments of the present application are described in detail below with reference to the following figures.

DETAILED DESCRIPTION

Figure 1:
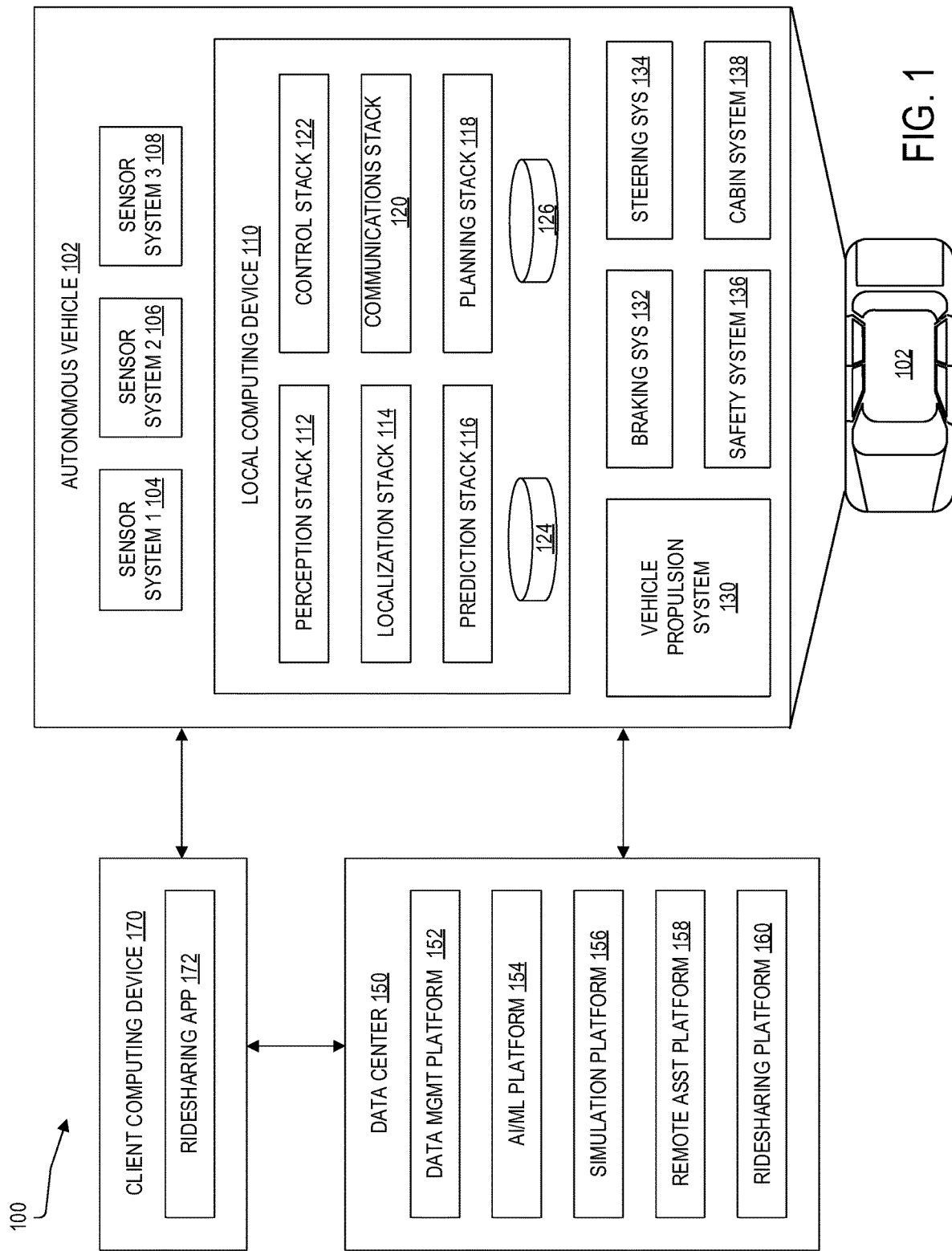
FIG. 1 illustrates an example of a system for managing one or more Autonomous Vehicles (AVs) in accordance with some examples of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Conventionally, on-road safety in simulation has been measured based on a binary determination of an occurrence of a collision, for example, zero (i.e., no collision and safe) or one (i.e., an occurrence of a collision and unsafe). As follows, on-road safety is typically determined by counting the number of collisions that occur in the simulation while driving for a certain length of miles (i.e., counting the frequency of collisions or calculating a collision rate).

Furthermore, it is challenging to measure the safety or predict a probability of a safety critical event in the simulation since an AV in the simulation does not have a human operator. Some features that rely on a human driver such as a human take-over event where a human driver takes over control of an AV cannot be accounted for when measuring the safety in simulation.

Therefore, there exists a need for measuring the on-road safety of an AV on a continuous scale (i.e., a continuous way of evaluating the safety for the on-road driving of the AV) in simulation. Further, there exists a need for measuring the on-road safety of an AV driving in simulation by taking into account the reactivity of simulated object(s) in the simulation. There also exists a need for training and using a machine learning model to measure safety, more specifically, to predict a probability of a safety critical event during AV driving in simulation.

The present technology includes systems, methods, and computer-readable media for solving the foregoing problems and discrepancies, among others. Further, the present technology provides other benefits as will be apparent from the figures and description provided herein.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The bounding area may by defined on grid that can be or include a rectangular, cylindrical, or spherical projection of the camera or LIDAR data.

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point. In some embodiments, the prediction stack 116 can output a probability distribution of likely paths or positions that the object is predicted to take.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be or include a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
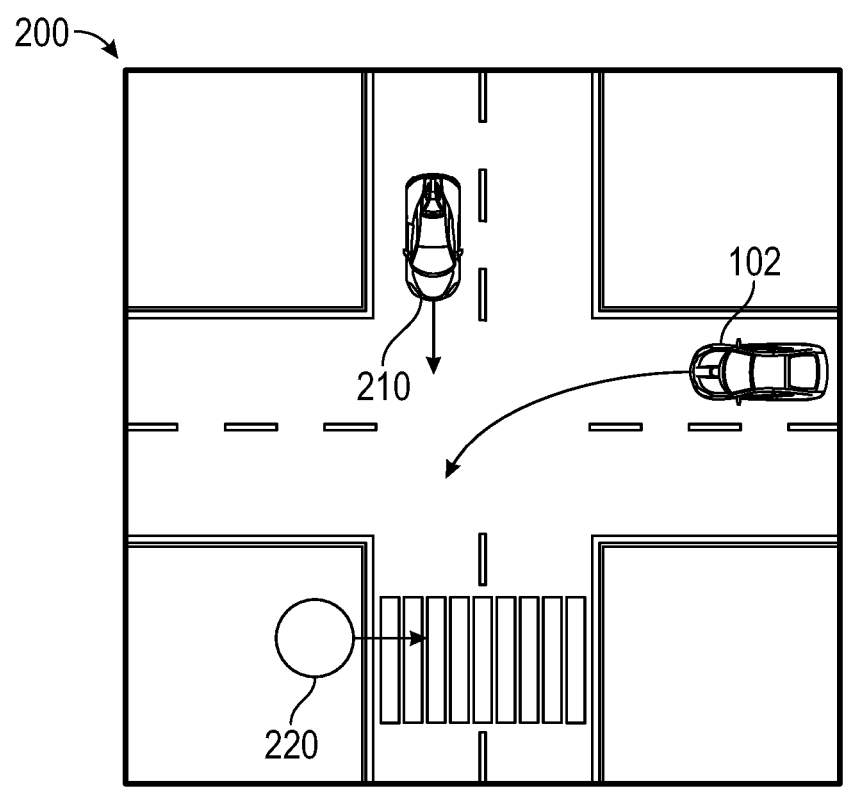
FIG. 2 illustrates an example simulated environment, in which a simulation safety score is generated on a continuous scale in accordance with some examples of the present disclosure.

FIG. 2 illustrates an example simulated environment 200, in which AV 102 drives along a path and a simulation safety score is generated on a continuous scale. The simulation safety score (i.e., quantified score) can indicate a likelihood of a safety critical event such as a collision or a near miss in the simulation.

A simulation, as shown in the example simulated environment 200 can be generated based on driving data. The data center 150 illustrated in FIG. 1 can use AV driving data (e.g., historical driving data) generated by sensor systems 104-108, stacks 112-122, and other components of AV 102 and/or data received by AV 102 from remote systems to create a simulation. The simulation platform 156 can also replicate a variety of driving environments and/or reproduce a simulated scenario (e.g., simulated environment 200) from data captured by AV 102.

In FIG. 2, the simulated environment comprises AV 102, simulated vehicle 210, and simulated pedestrian 220 at or approaching a four-way intersection. In the simulation, as AV 102 travels along its path, AV can collect simulation driving data, which can be generated by AV's sensor systems, stacks, or other components or can be received from remote systems. The simulation driving data can include environmental data that is descriptive of the environment perceived by AV 102, a path of AV 102, kinematic data of AV 102, a path of a simulated object, kinematic data of the simulated object. For example, the environmental data can include information pertaining to object(s) perceived by AV 102, such as vehicle 210 and pedestrian 220. The environmental data can also include information pertaining to a weather condition (e.g., rainy, snowy, foggy, clear, etc.), a road condition (e.g., ice patches, flooding, slipperiness, etc.), or a lighting condition (e.g., poor light or glare, etc.).

Furthermore, a machine learning algorithm (e.g., a simulation safety score prediction algorithm) of AI/ML platform 154 as illustrated in FIG. 1 may parse the simulation driving data into kinematic and semantic environmental features that represent characteristics of AV 102, objects (e.g., vehicle 210 and pedestrian 220), and/or environment 200. In some instances, the kinematic and semantic environmental features can be derived from physics models or statistical heuristics based on an error analysis process for iterating machine learning models.

In some examples, there are a variety of signals in the simulation driving data that can be integrated and/or processed to generate the kinematic and semantic environmental features as leading indicators for the probability of a safety critical event in the simulation. Some behavioral signals may indicate a high probability of a safety critical event. For example, if the AV swerves more often, or hard brakes more often, this might indicate that the safety critical event is more likely. Furthermore, the frequency of certain events may indicate a high probability of a safety critical event. For example, if near-collisions are frequent, this might indicate a high probability of a safety critical event.

For example, the kinematic and semantic environmental features can include but are not limited to a speed of the AV, an acceleration of the AV, a deceleration of the AV, a speed of a simulated object (e.g., vehicle 210 or pedestrian 220), an acceleration of the simulated object, a deceleration of the simulated object, a distance between the AV and the simulated objects, a relative direction of the AV to the simulated object, a relative position of the simulated object to the AV, the reactivity of the AV, reactivity of the simulated object, a type of the simulated object (e.g., car, truck, pedestrian, bike, motorcycle, etc.), a speed required to avoid a collision, and a kinematic time-to-collision between the AV and the simulated object.

The reactivity of the AV and/or simulated object can represent an extent to which the AV is aware of another object or environmental feature and is prepared to react to another object or the environmental feature such as potential future changes to an object's trajectory or planned path. Also, the kinematic time-to-collision can represent the time-to-collision between two objects if they continue on their current trajectories based on their accelerations, curvatures, speeds, etc. For example, even if a collision does not occur (e.g., if a collision is prevented by hard-braking or an evasive action), the kinematic time-to-collision can be calculated for each instant of AV driving, including instants prior to the collision-preventing maneuver. For the instants prior to the collision-preventing maneuver, the kinematic time-to-collision might be low (for example, 0.5 seconds), where the time-to-collision is calculated by propagating forward the trajectories of the AV and the interacting object, assuming they continued forward with the same accelerations, curvatures, speeds, etc. as in the specific instant and did not engage in the collision-preventing maneuver. In this way, an association can be modeled between a safety risk and/or a probability of a safety event occurring and a low instantaneous kinematic time-to-collision even if a collision did or did not actually occur in a given segment by using a feature in the model that was calculated up to the point at which a collision-preventing maneuver occurred. The minimum kinematic time-to-collision in a segment, e.g., 0.5 seconds, could indicate the risk of a given segment even though no collision has occurred.

Each of the kinematic and semantic environmental features can indicate a degree of collision risk and contribute to determinations of the simulation safety score or the probability of the safety critical event in the simulation. For example, a short distance between the AV and the simulated object, a high speed of the AV or the simulated object, high acceleration of the AV or the simulated object, high deceleration of the AV or the simulated object required to avoid the collision, or a high speed of the AV or the simulated object required to avoid the collision can indicate a high risk of the safety critical event. A low time-to-collision between the AV and the simulated object can indicate a high risk. Regarding the relative position and angle of the AV and the simulated object, a head-on collision from the front can indicate a high risk of the safety critical event.

According to some aspects, a machine learning algorithm (e.g., a simulation safety score predicted algorithm) of AI/ML platform 154 as illustrated in FIG. 1 may output a simulation safety score for the simulation. For example, a probability of a safety critical event can be predicted based on the kinematic and semantic environmental features. The simulation safety score can indicate a probability of a safety critical event (e.g., a collision or a near miss). In some examples, the predicted probability of the safety critical event is on a continuous scale, for example, a fractional value between 0 and 1. Instead of a hard cutoff for determining whether an event should be considered safe or unsafe, the events with a higher probability of the safety critical event are contributing more risk.

According to some examples, a machine learning algorithm (e.g., a simulation safety score prediction algorithm) of AI/ML platform 154 may categorize each of the kinematic and semantic environmental features into categories or buckets, for example, low, medium, and high or short, medium, and long. Each of the categories can represent a degree of risk of the safety critical event. For example, continuous variables can be transferred into discrete counterparts (i.e., categories or buckets). The categorization (i.e., bucketization) of the environmental features has the advantage of smoothly dealing with any missing values and reducing the risk of overlearning the machine learning model.

The bucketization of each of the kinematic and semantic features can be based on various types of operations such as user-defined cutoff values, quantile or quartile of continuous variables to assign approximately the same number of observations in each bucket, assigning a unique numerical value to the features, etc.

In some examples, the buckets can be categorical features without an implicit sense of order, for example, car, human, bike, and others. In another example, the buckets can be ordinal features that have an implicit sense of order, for example, low, medium, high, and extremely high.

Furthermore, the bucket size (i.e., a number of categories) for each of the features can vary. Also, the bucket size can be adjusted such that the simulation safety score or the probability of the safety critical event predicted by the safety proxy model correlates with historical safety critical events rates that are generated based on collections of historical driving data.

According to some examples, the path of the AV (e.g., AV 102) in the simulation can be segmented into a plurality of segments. In some examples, the plurality of segments are temporal segments based on time intervals of the path of the AV. The probability of the safety critical event can be outputted for every tick of driving (e.g., 10 Hz). Those probabilities can be aggregated into segments of 10 seconds. For each segment, a probability of a safety critical event can be calculated. Then, the probabilities from each of the segments can be aggregated to provide an expected amount of risk or safety. In other examples, the plurality of segments are distance segments based on distance intervals of the path of the AV. The probabilities from each of the distance segments can be also aggregated to provide an expected amount of risk or safety.

According to some examples, AI/ML platform 154 can train the machine learning algorithm (e.g., a simulation safety score prediction algorithm) into a safety proxy model. The safety proxy model is a machine-learned model to predict a probability of a safety critical event such as a collision or a near miss over every segment of AV driving in the simulation. The safety proxy model can be trained to learn the probability given the kinematic and semantic environmental features. The safety proxy model can transform input data (e.g., multiplies them, scaling them, combing them, interacting them, etc.) and predict the probability of the safety critical event in the simulation.

For example, a machine learning algorithm (e.g., a simulation safety score prediction algorithm) can, when trained, form a portion of prediction stack 116 of AV 102 illustrated in FIG. 1. In some instances, the machine learning algorithm is configured to process input (i.e., training datasets) to generate output and become trained to optimize the prediction of a safety critical event. In some instances, output can include a simulation safety score, which may be a quantified score for indicating a safety critical event such as a collision or a near miss based on training machine learning algorithm. As follows, the safety proxy model, once trained, is configured to predict the probability of the safety critical event in different calendar days, times of a day, geographical regions, etc.

In some instances, the safety proxy model can be trained with on-road driving data. The training data can include human takeover events as well as non-takeover events. A portion of the events can include actual collisions or predicted collisions (e.g., in case where a collision was prevented when a human operator in the AV took over control of the AV). In some examples, after converting the on-road driving data into kinematic and semantic environmental features, the safety proxy model can learn which features are best able to distinguish between safety critical events and non-safety critical events.

In some examples, certain interactions can be determined inherently risky without training the safety proxy model, i.e., from kinematic/first principles. For example, if the time-to-collision is less than 0.5 seconds in a given on-road driving segment, the model can predict a high risk for this segment. When the model learns the safety risk based on the kinematic/first principles, the performance of the model can be validated at predicting rates of historical collisions within different "pivots," i.e., different calendar days, times of a day, geographical regions, etc.

In some instances, once the simulation safety score is calculated, the simulation safety score can be compared against a number of collisions observed in historical driving data, which had been used to create the simulation. Specifically, at a macro level, the simulation safety score can be compared to the observed on-road rates of safety critical events (e.g., collisions or near misses) assuming that on-road scenarios are replayed at the same rate as they actually occurred.

A model that correlates best with historical safety critical events (e.g., collisions or near misses) and provides a dense leading indicator signal of safety risk can be determined optimal. A strong correspondence between replayed segments in simulation using simulated objects and observed on-road rates/trends can indicate that the simulation is properly calibrated (i.e., the simulated objects are reacting appropriately to the AV). If the simulated risk of a specific segment differs substantially, this might indicate that the behavior of the simulated object and/or the simulation model parameter needs refinement (e.g., turning of the weights of the features).

In some instances, the behavior of the simulated object in simulation can be learned, trained, tuned, or refined separately from the measurement of the safety score, e.g., the rate at which the simulated object stops or proceed through an intersection can be measured, learned, trained, tuned, or refined from the stopping rates observed on-road apart from whether the interactions between the simulated object and the AV can be considered a safety critical event.

In some examples, the safety proxy model can estimate the potential severity of a safety critical event such as a given collision or a near miss. These severities can then be combined with the model-outputted safety risk and/or probability of a collision to estimate a severity-weighted collision and/or near collision rate. For example, if the severity of an event A (SA) is scored as being twice the severity of an event B (SB), because the probability of injury from the collision in event A is twice that of event B, and the risk and/or probability of safety critical event A occurring is (PA) and the risk and/or probability of event B is (PB), then the severity-weighted risk of events A and B could be SA*PA+SB*PB. The severity scoring could include an injury risk component (based on, e.g., speeds and types of objects involved in the collision) as well as other business-related risks, such a reputational or legal factor. The estimated severity-weighted collision and/or near collision rate can be referred to as a dense "safety index" or DSI. As follows, the present disclosure can be applicable for power "dense safety index" (DSI) predictions where DSI can indicate a severity-weighted safety proxy (i.e., a probability of a safety critical event where the safety or risk is weighted).

Figure 3A:
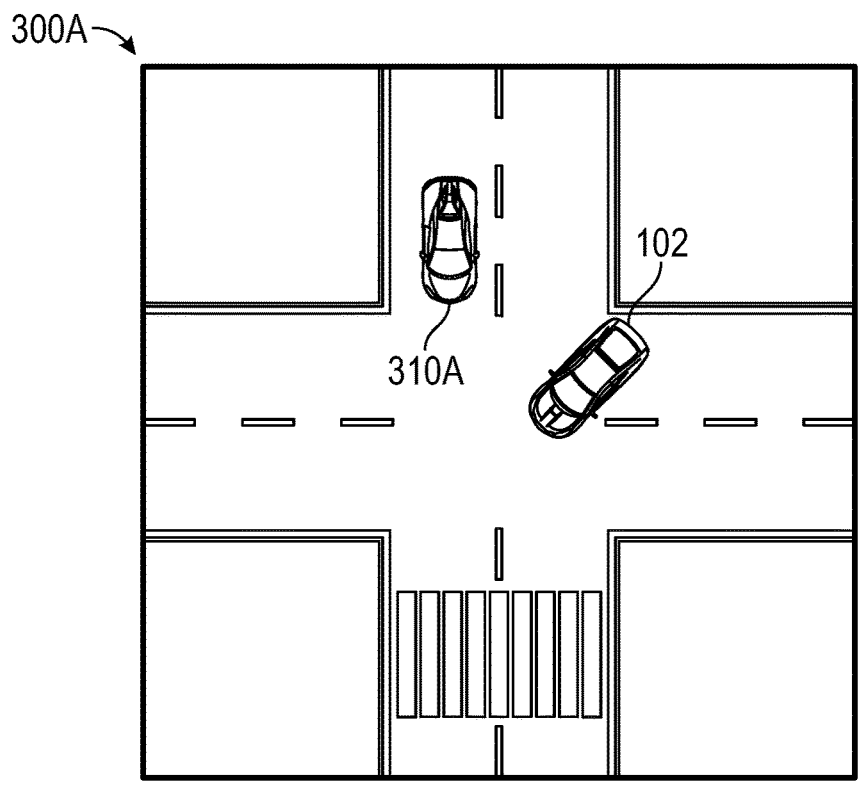
FIGS. 3A and 3B illustrate examples of a simulated environment, in which a simulated object travels along a predicted reactive trajectory with respect to an AV in simulation in accordance with some examples of the present disclosure.
Figure 3B:
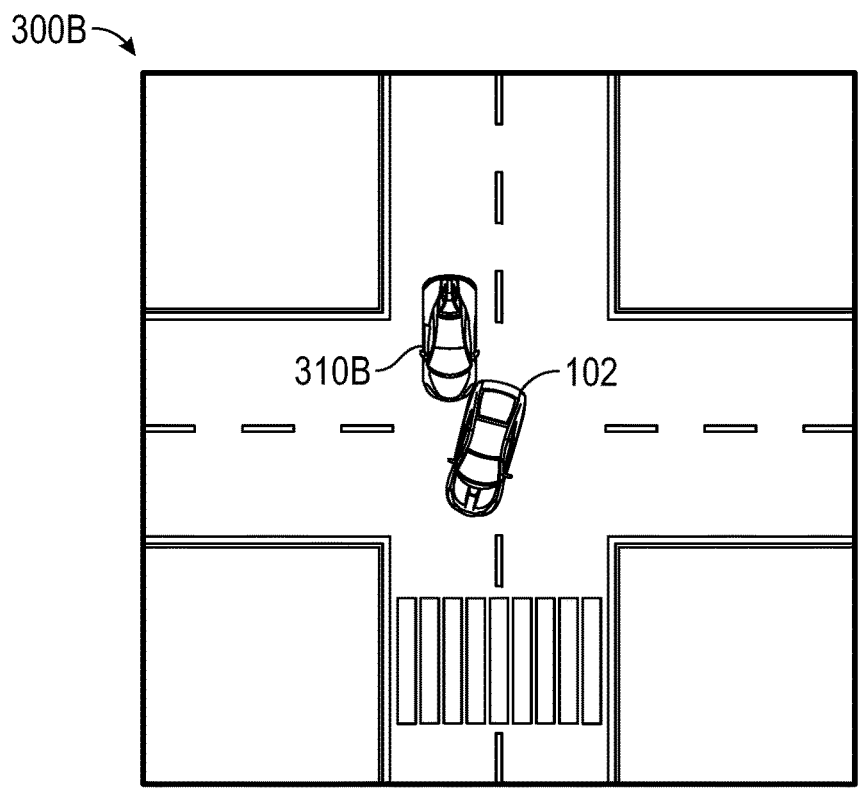

FIGS. 3A and 3B illustrate examples of a simulated environment 300A, 300B, in which a simulated vehicle 310A, 310B travels along a predicted reactive trajectory with respect to AV 102 in simulation in accordance with some examples of the present disclosure. In the real world, an AV is typically equipped with a human driver, who is allowed to assert manual control over the AV (i.e., a human take over). On the other hand, in simulation, an AV does not have a human driver. Rather, the AV autonomously pilots itself in simulation. Some features that are pertaining to a human driver such as a human take over cannot be considered in measuring the safety or predicting a probability of a safety critical event in simulation. The present disclosure solves the foregoing deficiencies by taking into account the reactivity of a simulated object with respect to an AV. As illustrated in FIGS. 3A and 3B, a plurality of reactive trajectories can be predicted in response to a driving behavior of an AV.

According to some examples, the historical driving data can be collected from periods around an occurrence of a human take over event. For example, a human driver may have taken over control of AV 102 and stopped AV 102 at the four-way intersection to avoid crashing into a vehicle or a pedestrian. When such historical driving data is used to create a simulation, while the AV 102 stopped at the four-way intersection in the real world, AV 102 may continue autonomously piloting itself and proceed to enter the four-way intersection in simulation without any human intervention.

In such cases, multiple scenarios based on the reactivity of the simulated object can be predicted. In each scenario, the simulated object may take a different path depending on the reactivity of the simulated object in response to the driving behavior of AV. For example, in simulation, a plurality of reactive trajectories of the simulated object can be projected with respect to the AV on the predicted trajectory of the AV in the simulation.

For each reactive trajectory, a safety score can be outputted. These safety scores can then be aggregated or integrated based on the likelihood that the reactive agent (e.g., the simulated object) takes the specific projected trajectory. For example, with a set of simulations where there is a 25% probability that a simulated object stops at an intersection with a predicted safety score (SS1) and a 75% probability that the simulated object proceeds through with a predicted safety score (SS2), the net score for the set of simulations could be (0.25)*(SS1)+(0.75)*(SS2).

As shown in FIG. 3A, AV 102 enters the intersection, without human intervention (i.e., in the absence of a human take over), to make a right turn. The simulated vehicle 310A may decide to stop at the intersection in response to AV 102 driving towards the intersection so that a safety critical event (e.g., a collision or a near miss) can be avoided.

In FIG. 3B, AV 102 enters the intersection, without human intervention (i.e., in the absence of a human take over), to make a right turn. The simulated vehicle 310B may decide to proceed to enter the intersection based on reactivity of the simulated vehicle (e.g., lack of enough response time). As follows, the simulated vehicle 310B crashes into AV 102.

Figure 4:
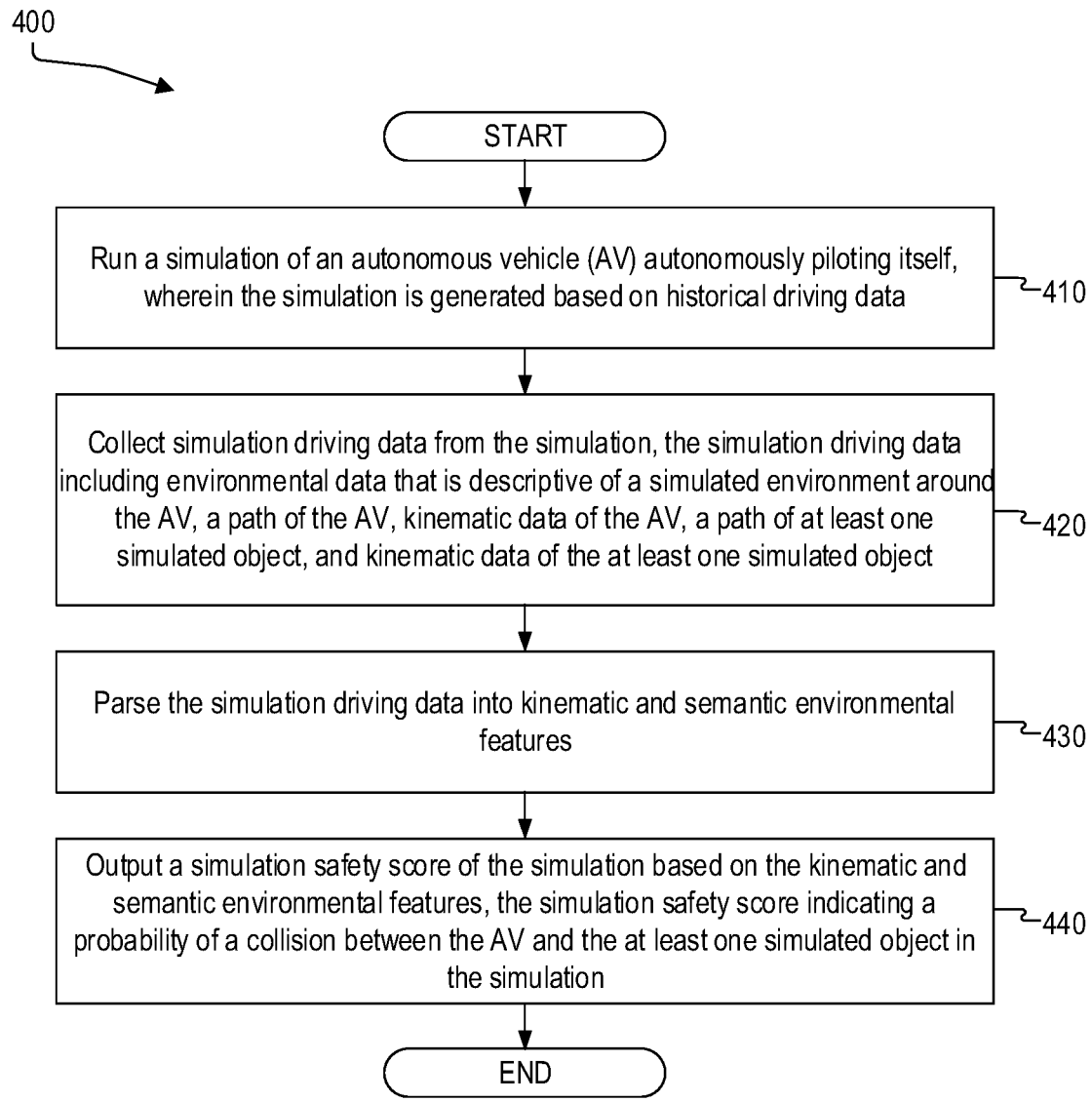
FIG. 4 illustrates a flowchart of a method for outputting a simulation safety score for a simulation of an AV in accordance with some examples of the present disclosure.

FIG. 4 is a flowchart of an example method 400 for outputting a simulation safety score for a simulation of an AV. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements the method 400 may perform functions at substantially the same time or in a specific sequence.

According to some examples, at step 410, method 400 includes running a simulation of an AV autonomously piloting itself, wherein the simulation is generated based on driving data such as historical driving data. For example, the data center 150 illustrated in FIG. 1 can use AV historical driving data generated by sensor systems 104-108, stacks 112-122, and other components of AV 102 and/or data received by AV 102 from remote systems to create a simulation. The simulation platform 156 can also replicate a variety of driving environments and/or reproduce a simulated scenario (e.g., simulated environment 200, 300A, 300B illustrated in FIGS. 2, 3A, and 3B, respectively) from data captured by AV 102.

According to some examples, at step 420, method 400 includes collecting simulation driving data from the simulation, the simulation driving data including environmental data that is descriptive of a simulated environment around the AV, a path of the AV, kinematic data of the AV, a path of at least one simulated object, and kinematic data of the at least one simulated object. For example, data center 150 as illustrated in FIG. 1 may collect simulation driving data from the simulation. The simulation driving data can include environmental data that is descriptive of a simulated environment around the AV (e.g., example environment 200, 300A, 300B), a path of AV 102, kinematic data of AV 102, a path of a simulated object (e.g., vehicle 210, 310A, 310B or pedestrian 220), and kinematic data of the simulated object. Further, the environmental data can include, as previously described, information pertaining to object(s) perceived by AV 102 or environment such as a weather condition, a road condition, or a lighting condition.

According to some examples, at step 430, method 400 includes parsing the simulation driving data into kinematic and semantic environmental features. Each of the kinematic and semantic environmental features can indicate a degree of collision risk and contribute to determinations of the simulation safety score or the probability of the safety critical event in the simulation. As described with respect to FIG. 1, some examples of the kinematic and semantic environmental features include, but are not limited to, a speed of the AV, a speed of a simulated object, and a distance between the AV and the simulated object, a kinematic time-to-collision, a distance between the AV and the simulated object, an acceleration of the AV, a relative direction of the AV to the simulated object, a relative position of the simulated object to the AV, reactivity of the AV, reactivity of the simulated object, an acceleration of the simulated object, a deceleration of the simulated object, and a type of the simulated object.

According to some examples, at step 440, method 400 includes outputting a simulation safety score of the simulation based on the kinematic and semantic environmental features, the simulation safety score indicating a probability of a collision between the AV and the at least one simulated object in the simulation. For example, AI/ML platform 154 as illustrated in FIG. 1 may output a simulation safety score for the simulation. The simulation safety score indicates a probability of a collision between AV 102 and the simulated object in the simulation. A term "collision" is used herein to collectively include a collision and a near miss (i.e., near collisions).

In some instances, the simulation safety score is based on a continuous scale between two numbers, for example, 0 and 1 (i.e., a fractional value). Also, the continuous scale may correlate to a continuous likelihood of the collision between the AV and the simulated object in simulation.

According to some aspects, the driving data can be collected from periods around an occurrence of a human take over event. The human take over event is an instance where a human driver takes over control of an AV. When such driving data is used to create a simulation, method 400 includes predicting a trajectory of the AV, in simulation, that the AV would have traveled if the human did not take over control of the AV. For example, in simulation, due to the lack of a human driver, the AV may continue to pilot autonomously itself. As follows, the AV would take a different path, compared to the path that the AV has taken in the real world as captured in the driving data.

Further, method 400 includes predicting a plurality of reactive trajectories of the simulated object with respect to the AV on the predicted trajectory of the AV in the simulation. For example, AI/ML platform 154 as illustrated in FIG. 1 may predict a plurality of reactive trajectories of the simulated object that the simulated object would have taken in response to the driving behavior of the AV in the absence of a human take over. AI/ML platform 154 illustrated in FIG. 1 can predict various scenarios, depending on the reactivity of the simulated object and predict a plurality of trajectories that the simulated object may take in simulation.

In some examples, the potential trajectories of the simulated object can be predicted based on, for example, speed, acceleration, deceleration, and semantic expressions of intent (e.g., turning signals) as well as environmental features relating to the road (e.g. static and dynamic object(s) perceived by AV, such as vehicles and pedestrians; weather conditions; road conditions (e.g., ice patches, flooding, slipperiness, etc.); lighting conditions, etc.), presence of traffic controls (e.g., turning lanes, stop signs, etc.), and the simulated object's relative relationship to the AV (e.g., a distance between the simulated object and the AV, the angle between the simulated object and the AV). The potential trajectories of simulated objects utilized in the safety proxy model can be learned/trained by taking a large amount of on-road driving data and determining which sets of features (e.g., kinematic and semantic environmental features) are predictive of given outcomes (i.e., which speeds, accelerations, semantic expressions, traffic controls are predictive of stopping at an intersection or proceeding through the intersection). Further, the semantic expressions can include whether an operator of the simulated object was paying attention to the road or was distracted (i.e., whether a driver's glance was toward the road or downward in the case of a distracted operator). The semantic expressions can also include whether an emergency signal, siren, or flash is engaged.

Also, method 400 includes determining a probability of a collision between the AV and the at least one simulated object for each of the plurality of reactive trajectories of the at least one simulated object in the simulation. The probabilities from each of the plurality of reactive trajectories can be aggregated to determine the simulation safety score.

According to some instances, method 400 includes comparing the simulation safety score against a number of collisions observed in the driving data. The predicted probability of a safety critical event (e.g., a collision between an AV and a simulated object) in simulation can be compared against the number of collisions observed in the driving data, which was used for creating the simulation.

As previously described, at a macro level, the simulated number of safety critical events (e.g., collisions or near misses) can be compared to those observed on-road, grouped by "pivot" (e.g., night vs. day, etc.). The difficulty of the simulated segments can be calibrated to the difficulty of the on-road segments, either simulating replays of the exact same segments as occurred on road or by defining a "similarity score" or "difficulty score" based on the complexity of the scene and ensuring that the simulated segments were tuned to match the difficulty of the on-road driving. At a micro level, the safety proxy model can be validated by replaying simulated segments where the simulated behavior of the AV resembles the behavior of the AV observed on-road (i.e., as collected in driving data) and comparing the differences between the behavior of simulated objects and the behavior of the observed objects in the scene, as well as the simulation safety proxy's estimate of the risk and an "on-road" safety proxy estimate of risk where an "on-road" safety proxy is a model that is trained using features generated from actual, on-road environmental and kinematic factors, including human vehicle operator actions, potentially. between those behaviors.

According to some examples, method 400 further includes analyzing the kinematic and semantic environmental features into a plurality of categories, the plurality of categories representing a degree of a collision risk, wherein the safety score is determined based on the plurality of categories. For example, AI/ML platform 154 as illustrated in FIG. 1 may analyze the kinematic and semantic environmental features into a plurality of categories. Each of the plurality of categories represents a degree of collision risk. AI/ML platform 154 as illustrated in FIG. 1 may determine the simulation safety score based on the plurality of categories.

According to some examples, method 400 further includes segmenting the simulation or the path of AV that AV has taken in the simulation into a plurality of segments, wherein the probability of the collision between the AV and the at least one object is determined for each of the plurality of segments. For example, AI/ML platform 154 as illustrated in FIG. 1 may segment the path of AV 102 into a plurality of segments and determine the probability of the collision between AV 102 and the at least one object for each of the plurality of segments.

Furthermore, method 400 includes aggregating the probabilities of the collision from each of the plurality of segments to determine the simulation safety score. For example, AI/ML platform 154 as illustrated in FIG. 1 may aggregate the probabilities of the collision from each of the plurality of segments and determine the simulation safety score based on the aggregation of those probabilities.

In some instances, the plurality of segments are temporal segments based on time intervals of the path of the AV that the AV has taken in the simulation. In some examples, the plurality of segments are distance segments based on distance intervals of the path of the AV that the AV has taken in the simulation.

Figure 5:
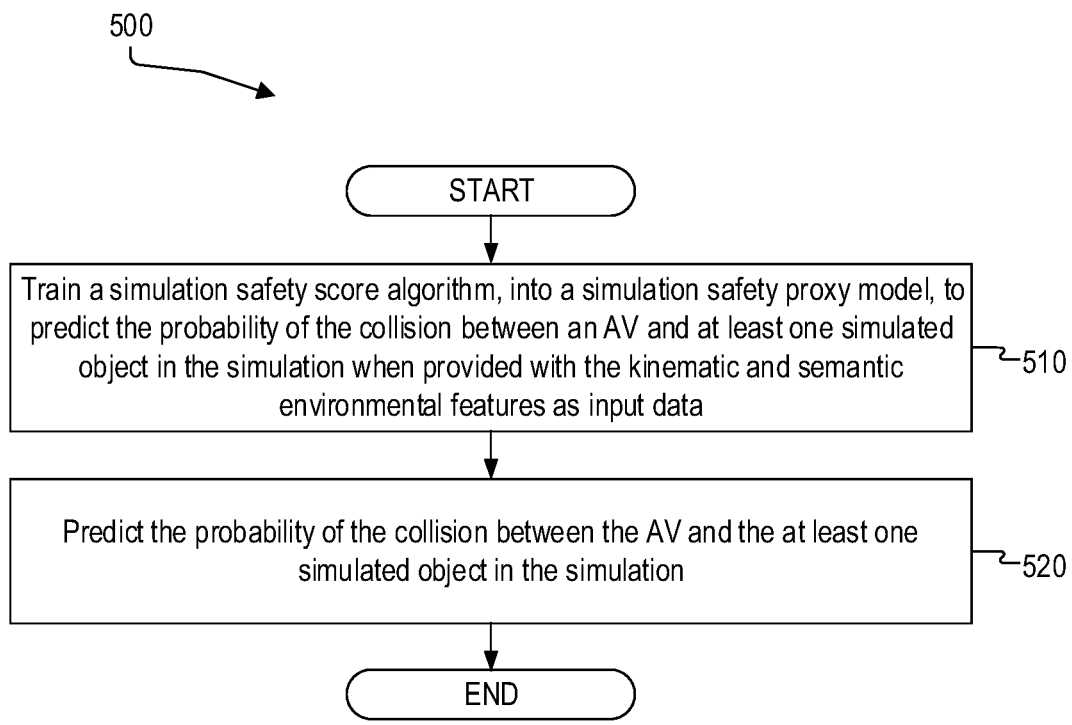
FIG. 5 illustrates a flowchart of a method of training a machine learning algorithm into a machine learning model to predict a probability of a collision in simulation in accordance with some examples of the present disclosure.

FIG. 5 illustrates a flowchart of an example method 500 of training a machine learning algorithm into a machine learning model to predict a probability of a collision in simulation. Although example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements the method 500 may perform functions at substantially the same time or in a specific sequence.

According to some examples, at step 510, method 500 includes training a simulation safety score algorithm, into a simulation safety proxy model, to predict the probability of the collision between the AV and the at least one simulated object in the simulation when provided with the kinematic and semantic environmental features as input data. For example, AI/ML platform 154 as illustrated in FIG. 1 may train the simulation safety score prediction algorithm, into a safety proxy model, to predict the probability of the collision between AV 102 and a simulated object when provided with the kinematic and semantic environmental features as input data.

According to some examples, at step 520, method 500 includes predicting the probability of the collision between the AV and the at least one simulated object in the simulation. For example, AI/ML platform 154 as illustrated in FIG. 1 may predict the probability of the collision between AV 102 and the simulated object (e.g., vehicle 210 or pedestrian 220 illustrated in FIG. 2).

Figure 6:
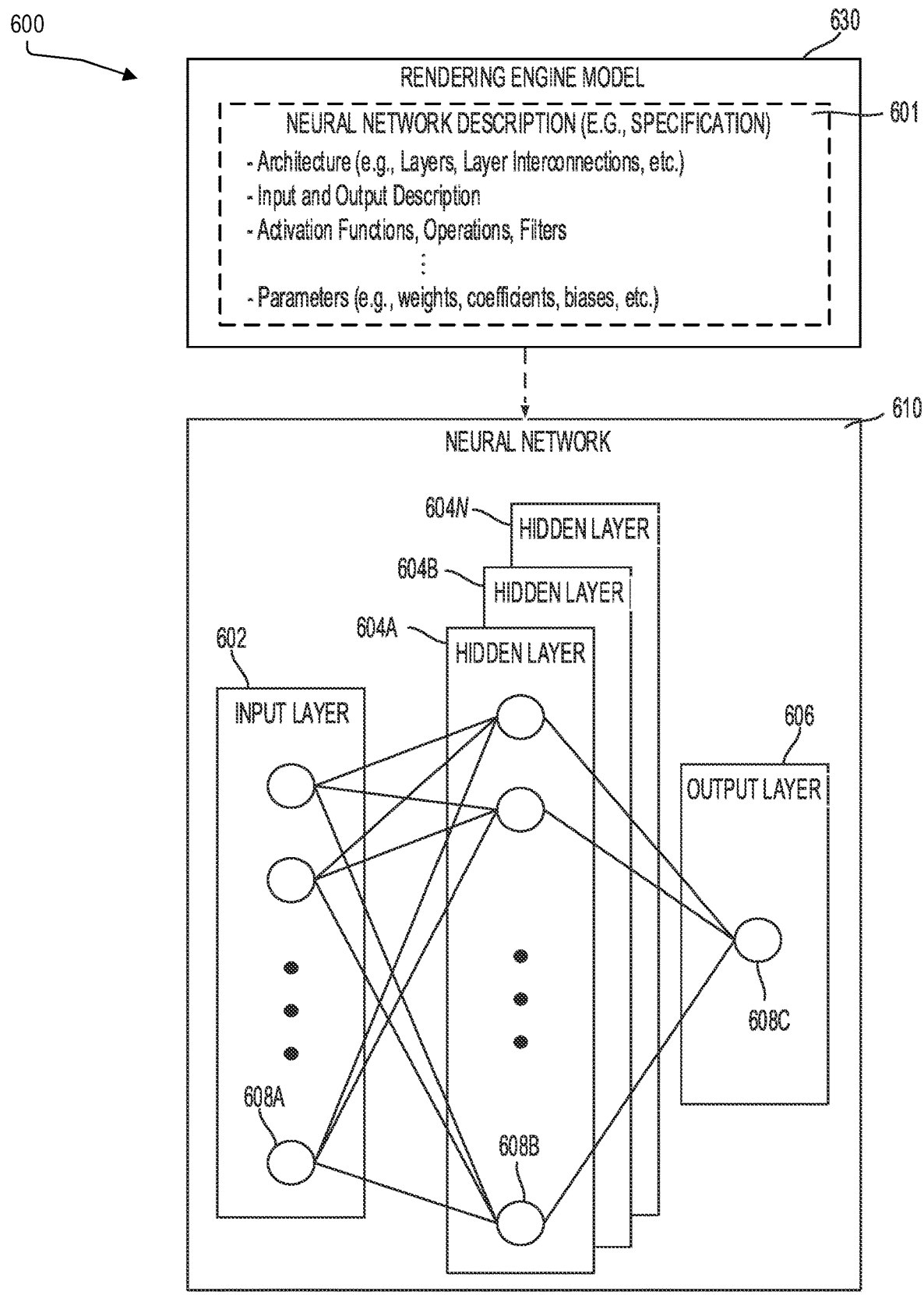
FIG. 6 illustrates an example neural network architecture in accordance with some examples of the present technology.

FIG. 6 illustrates an example neural network architecture, in accordance with some aspects of the present technology. Architecture 600 includes a neural network 610 defined by an example neural network description 601 in rendering engine model (neural controller) 630. The neural network 610 can represent a neural network implementation of a rendering engine for rendering media data. The neural network description 601 can include a full specification of the neural network 610, including the neural network architecture 600. For example, the neural network description 601 can include a description or specification of the architecture 600 of the neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 610 reflects the architecture 600 defined in the neural network description 601. In this example, the neural network 610 includes an input layer 602, which includes input data, information about objects (e.g., vehicle 102) in an environment as perceived by sensors 104, 106, 108 of the AV 102. In one illustrative example, the input layer 602 can include data representing a portion of the input media data such as a patch of data or pixels (e.g., a 128×128 patch of data) in an image corresponding to the input media data (e.g., that of vehicle 102 and the environment).

The neural network 610 includes hidden layers 604A through 604N (collectively "604" hereinafter). The hidden layers 604 can include n number of hidden layers, where n is an integer greater than or equal to one. The number of hidden layers can include as many layers as needed for a desired processing outcome and/or rendering intent. The neural network 610 further includes an output layer 606 that provides an output (e.g., paths that are outputted to a trained planning algorithm) resulting from the processing performed by the hidden layers 604. In one illustrative example, the output layer 606 can provide paths that are most likely to occur and a path that is considered an object collision path.

The neural network 610 in this example is a multi-layer neural network of interconnected nodes. Each node can represent a piece of information. Information associated with the nodes is shared among the different layers and each layer retains information as information is processed. In some cases, the neural network 610 can include a feed-forward neural network, in which case there are no feedback connections where outputs of the neural network are fed back into itself. In other cases, the neural network 610 can include a recurrent neural network, which can have loops that allow information to be carried across nodes while reading in input.

Information can be exchanged between nodes through node-to-node interconnections between the various layers. Nodes of the input layer 602 can activate a set of nodes in the first hidden layer 604A. For example, as shown, each of the input nodes of the input layer 602 is connected to each of the nodes of the first hidden layer 604A. The nodes of the hidden layer 604A can transform the information of each input node by applying activation functions to the information. The information derived from the transformation can then be passed to and can activate the nodes of the next hidden layer (e.g., 604B), which can perform their own designated functions. Example functions include convolutional, up-sampling, data transformation, pooling, and/or any other suitable functions. The output of the hidden layer (e.g., 604B) can then activate nodes of the next hidden layer (e.g., 604N), and so on. The output of the last hidden layer can activate one or more nodes of the output layer 606, at which point an output is provided. In some cases, while nodes (e.g., nodes 608A, 608B, 608C) in the neural network 610 are shown as having multiple output lines, a node has a single output and all lines shown as being output from a node represent the same output value.

In some cases, each node or interconnection between nodes can have a weight that is a set of parameters derived from training the neural network 610. For example, an interconnection between nodes can represent a piece of information learned about the interconnected nodes. The interconnection can have a numeric weight that can be tuned (e.g., based on a training dataset), allowing the neural network 610 to be adaptive to inputs and able to learn as more data is processed.

The neural network 610 can be pre-trained to process the features from the data in the input layer 602 using the different hidden layers 604 in order to provide the output through the output layer 606. In an example in which the neural network 610 is used to identify an object collision path from a trained object path prediction algorithm, the neural network 610 can be trained using training data that includes example objects (e.g., vehicle 102) in an environment as perceived by sensors 104-108 of the AV 102. For instance, training images can be input into the neural network 610, which can be processed by the neural network 610 to generate outputs which can be used to tune one or more aspects of the neural network 610, such as weights, biases, etc.

In some cases, the neural network 610 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 610 can perform a backward pass by determining which inputs (weights) most contributed to the loss of the neural network 610, and can adjust the weights so that the loss decreases and is eventually minimized.

A derivative of the loss with respect to the weights can be computed to determine the weights that contributed most to the loss of the neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 610 can represent any other neural or deep learning network, such as an autoencoder, a deep belief nets (DBNs), a recurrent neural networks (RNNs), etc.

Figure 7:
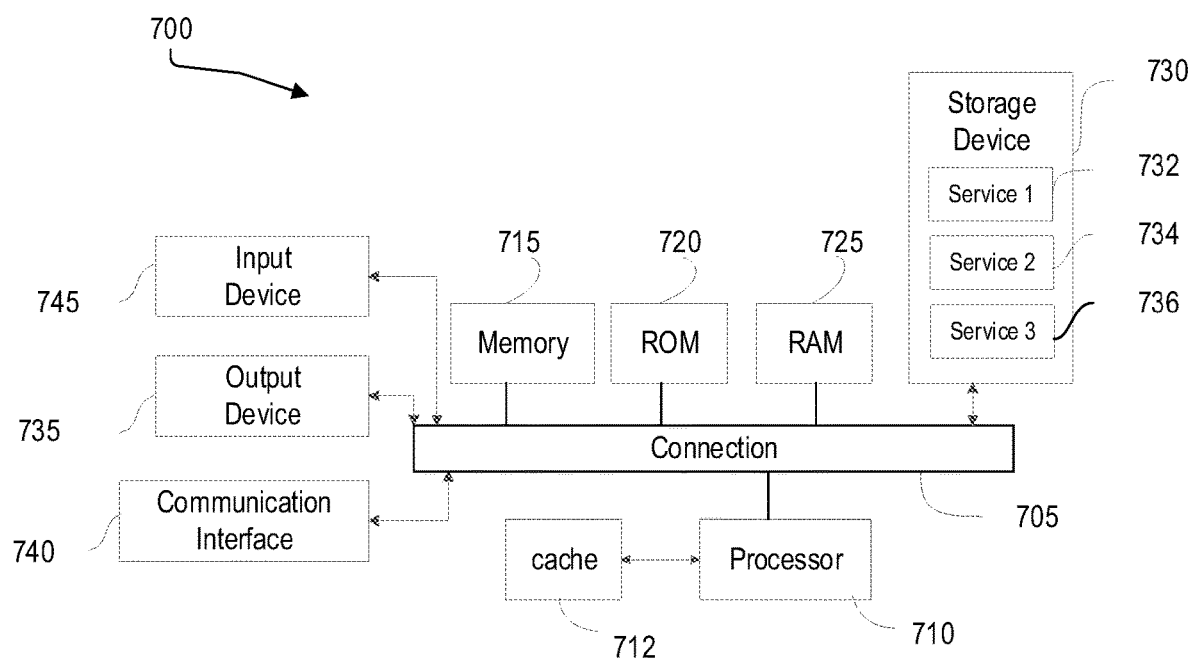
FIG. 7 illustrates an example processor-based system with which some aspects of the subject technology can be implemented.

FIG. 7 shows an example of computing system 700, which can be for example any computing device making up AV management system 100, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The invention claimed is:

1. A method comprising:
running a simulation of an autonomous vehicle (AV) autonomously piloting itself, wherein the simulation is generated based on driving data;
collecting simulation driving data from the simulation, the simulation driving data including environmental data that is descriptive of a simulated environment around the AV, a path of the AV, kinematic data of the AV, a path of at least one simulated object, and kinematic data of the at least one simulated object;
parsing the simulation driving data into kinematic and semantic environmental features;
outputting a simulation safety score of the simulation based on the kinematic and semantic environmental features, the simulation safety score indicating a probability of a collision between the AV and the at least one simulated object in the simulation; and
training a simulation safety score prediction algorithm, into a simulation safety proxy model, to predict the probability of the collision between the AV and the at least one simulated object in the simulation when provided with the kinematic and semantic environmental features as input data, wherein the training comprises backpropagation of a neural network to adjust a weight of at least one node in the neural network.

2. The method of claim 1, wherein the driving data is collected from periods around an occurrence of a human take over event, the human take over event being an instance where a human takes over control of the AV, the method further comprising:
predicting a trajectory of the AV in the simulation that the AV would have traveled if the human did not take control of the AV;
predicting a plurality of reactive trajectories of the at least one simulated object with respect to the AV on the predicted trajectory of the AV in the simulation; and
determining a probability of the collision between the AV and the at least one simulated object for each of the plurality of reactive trajectories of the at least one simulated object in the simulation.

3. The method of claim 1, further comprising:
predicting a plurality of reactive trajectories of the at least one simulated object with respect to the AV based on the simulation driving data including the environmental data that is descriptive of the simulated environment around the AV, the path of the AV, the kinematic data of the AV, the path of at least one simulated object, and the kinematic data of the at least one simulated object.

4. The method of claim 1, further comprising:
analyzing the kinematic and semantic environmental features into a plurality of categories, the plurality of categories representing a degree of a collision risk, wherein the simulation safety score is determined based on the plurality of categories.

5. The method of claim 1, wherein the simulation safety score is based on a continuous scale between two numbers, wherein the continuous scale correlates to a continuous likelihood of the collision between the AV and the at least one simulated object.

6. The method of claim 1, further comprising:
comparing the simulation safety score against a number of collisions observed in the driving data.

7. The method of claim 1, wherein the kinematic and semantic environmental features include a type of the at least one simulated object, a speed of the AV, a speed of the at least one simulated object, and a distance between the AV and the at least one simulated object.

8. A system comprising:
one or more processors; and
a computer-readable medium comprising instructions stored therein, which when executed by the one or more processors, cause the one or more processors to:
run a simulation of an autonomous vehicle (AV) autonomously piloting itself, wherein the simulation is generated based on driving data;
collect simulation driving data from the simulation, the simulation driving data including environmental data that is descriptive of a simulated environment around the AV, a path of the AV, kinematic data of the AV, a path of at least one simulated object, and kinematic data of the at least one simulated object;
parse the simulation driving data into kinematic and semantic environmental features; and
output a simulation safety score of the simulation based on the kinematic and semantic environmental features, the simulation safety score indicating a probability of a collision between the AV and the at least one simulated object in the simulation; and
train a simulation safety score prediction algorithm, into a simulation safety proxy model, to predict the probability of the collision between the AV and the at least one simulated object in the simulation when provided with the kinematic and semantic environmental features as input data, wherein causing the one or more processors to train comprises backpropagation of a neural network to adjust a weight of at least one node in the neural network.

9. The system of claim 8, wherein the driving data is collected from periods around an occurrence of a human take over event, the human take over event being an instance where a human takes over control of the AV, wherein the instructions, which when executed by the one or more processors, further cause the one or more processors to:
predict a trajectory of the AV in the simulation that the AV would have traveled if the human did not take control of the AV;
predict a plurality of reactive trajectories of the at least one simulated object with respect to the AV on the predicted trajectory of the AV in the simulation; and
determine a probability of the collision between the AV and the at least one simulated object for each of the plurality of reactive trajectories of the at least one simulated object in the simulation.

10. The system of claim 8, wherein the instructions, which when executed by the one or more processors, further cause the one or more processors to:
predict a plurality of reactive trajectories of the at least one simulated object with respect to the AV based on the simulation driving data including the environmental data that is descriptive of the simulated environment around the AV, the path of the AV, the kinematic data of the AV, the path of at least one simulated object, and the kinematic data of the at least one simulated object.

11. The system of claim 8, wherein the instructions, which when executed by the one or more processors, further cause the one or more processors to:
analyze the kinematic and semantic environmental features into a plurality of categories, the plurality of categories representing a degree of a collision risk, wherein the simulation safety score is determined based on the plurality of categories.

12. The system of claim 8, wherein the simulation safety score is based on a continuous scale between two numbers, wherein the continuous scale correlates to a continuous likelihood of the collision between the AV and the at least one simulated object.

13. The system of claim 8, wherein the instructions, which when executed by the one or more processors, further cause the one or more processors to:
compare the simulation safety score against a number of collisions observed in the driving.

14. The system of claim 8, wherein the kinematic and semantic environmental features include a speed of the AV, a speed of the at least one simulated object, and a distance between the AV and the at least one simulated object.

15. A non-transitory computer-readable storage medium comprising computer-readable instructions, which when executed by a computing system, cause the computing system to:
run a simulation of an autonomous vehicle (AV) autonomously piloting itself, wherein the simulation is generated based on driving data;
collect simulation driving data from the simulation, the simulation driving data including environmental data that is descriptive of a simulated environment around the AV, a path of the AV, kinematic data of the AV, a path of at least one simulated object, and kinematic data of the at least one simulated object;
parse the simulation driving data into kinematic and semantic environmental features; and
output a simulation safety score of the simulation based on the kinematic and semantic environmental features, the simulation safety score indicating a probability of a collision between the AV and the at least one simulated object in the simulation; and
train a simulation safety score prediction algorithm, into a simulation safety proxy model, to predict the probability of the collision between the AV and the at least one simulated object in the simulation when provided with the kinematic and semantic environmental features as input data, wherein causing the computing system to train comprises backpropagation of a neural network to adjust a weight of at least one node in the neural network.

16. The non-transitory computer-readable storage medium of claim 15, wherein the driving data is collected from periods around an occurrence of a human take over event, the human take over event being an instance where a human takes over control of the AV, wherein the instructions, which when executed by the computing system, further cause the computing system to:
predict a trajectory of the AV in the simulation that the AV would have traveled if the human did not take control of the AV;
predict a plurality of reactive trajectories of the at least one simulated object with respect to the AV on the predicted trajectory of the AV in the simulation; and
determine a probability of the collision between the AV and the at least one simulated object for each of the plurality of reactive trajectories of the at least one simulated object in the simulation.

17. The non-transitory computer-readable storage medium of claim 15, wherein the instructions, which when executed by the computing system, further cause the computing system to:
predict a plurality of reactive trajectories of the at least one simulated object with respect to the AV based on the simulation driving data including the environmental data that is descriptive of the simulated environment around the AV, the path of the AV, the kinematic data of the AV, the path of at least one simulated object, and the kinematic data of the at least one simulated object.

* * * * *